June 1, 1965   S. P. J. KEINÄNEN   3,186,466
ANTI-SKID ELEMENT FOR THE TREAD OF A VEHICLE TIRE
Filed April 17, 1962

INVENTOR.
SULO PAARVO JOHANNES KEINÄNEN
BY
AGENT

United States Patent Office

3,186,466
ANTI-SKID ELEMENT FOR THE TREAD OF A VEHICLE TIRE
Sulo Paavo Johannes Keinänen, Nummela, Finland
Filed Apr. 17, 1962, Ser. No. 188,192
Claims priority, application Canada, Nov. 15, 1961, 836,113
2 Claims. (Cl. 152—210)

This invention relates to an anti-skid element for fastening substantially vertically in the tread of a vehicle tire.

The present invention is based on investigations carried on during many years and on the conclusions based on the thus obtained results regarding the requirements for a good anti-skid tire. The anti-skid element according to the invention, in completed trial runs and thereafter in daily use, has proved to fully answer all the requirements in this respect.

First of all, the anti-skid element has to be constructed of material that has the highest wearing properties, i.e., the wear on the element is to be equal to the wear of rubber on the tread. Experience has proved most clearly that hard metal plugs embedded into the tread surface wear best.

Secondary, to make such an anti-skid element as effective and lasting in use as possible, different factors must be taken into consideration in connection with the work to be performed by a device like this. The principal factors in the performance of the anti-skid element include its performance on a semi-hard surface such as for example an icy road, its tendency to change its position due to forces appearing along the road surface, the known side-effects and the keeping of the anti-skid element continually at its proper level in the tire tread.

The performance of the anti-skid element in a vertical direction to the road surface on an asphalt paving and on ice must be considered together because the requirements are in a very close relation. On a semi-hard road, the anti-skid element must be pressed into the road surface, but on a hard paving, it has to be pressed into the tire in order that the best possible grip on the road be obtained in both cases. This is achieved by a correct dimensioning of the anti-skid element and by fastening the same on the tire so that a sufficiently large rubber layer remains between the element and the tire carcass. The decisive factors in the dimensioning are the area of the outer end of the element and the area of the flange on the supporting part according to the invention, which areas have to be in a strictly determined relation. If the flange area is too small, the result will be that the anti-skid element is unable to press itself into the ice, as the same will be pressed into the tire by a fairly slight pressure against the surface, in which case its gripping properties are reduced. On the other hand, if the flange is too large it will prevent the element from entering the tire so that, even when driving on a paved road, the anti-skid elements are kept in their protruding position, thus reducing the wearing properties of the tire on an ice-free road and, besides this, exposing the element to greater wear than otherwise. The same result ensures if the member is fixed directly to the carcass, as it will not be able to make its sinking vertically resilient movements and thus gradually cause breakage in the carcass.

By action of forces in the direction of the road surface, all anti-skid elements have a tendency to alter their position in the tire or incline in the direction of the force. The smaller this inclination remains, the greater is the effect that makes the anti-skid element sink into the road surface. The best means for resisting the inclination has proved to be a sharp-edged, supporting flange tapering evenly towards the edge according to the invention. The most suitable placing of the flange is as deep as possible inside the tread, in which case the angular change of the anti-skid element remains the smallest possible.

One of the most important causes for undersirable side-effects encountered in the use of anti-skid elements is the entering of sand and water between the device and the rubber and, furthermore, the unpleasant sound while driving on a hard pavement. Both of these occurrences can be eliminated without difficulty by following the here above stated requirements. When a rubber layer is left between the carcass and the element to provide resiliency, the same simultaneously acts as a sound-absorbing layer, so that the carcass in the tire cannot act as a soundboard, but the sound is reduced to the minimum. Besides this, the above-indicated shape of the flange on the supporting member reduces to the utmost the possibility of the anti-skid element becoming inclined so that openings between the rubber tread and the element are not very easily formed during driving, which would be the case if the anti-skid member could incline to a greater degree. The possibility of such opening can further be reduced by constructing the anti-skid element so that the same to its longest possible length has a cylindrical form, by which means the rubber on the tread will effectively press itself against the element and thus provide sufficient compression.

To secure the anti-skid element at a constant level in relation to the tread is also a very important factor, because if outer forces move the element towards the carcass in the tire, it will entirely lose its effect. It is also very important that the anti-skid element does not cause wear on the rubber of the tread around it. This will be appreciated when considering the driving on a hard paving during which the anti-skid element might have to make millions of in- and outward movements. In this connection it might also be mentioned in short, that this problem has been solved in a very advantageous form by providing the hard-metal plug with a supporting shell of an elastic and easily sliding plastic material which does not wear the rubber.

Besides the here above described requirements, there still remains an important condition, i.e., that the anti-skid element has to be as light as possible and that its manufacturing costs have to be sufficiently low.

The experience gained in connection with the present invention has led to conclusions that have resulted in the above given requirements. The finding of these requirements in itself has to be considered as novel and of pioneering nature among investigations concerning the question of how to produce anti-skid devices answering present road conditions. The anti-skid element according to the invention presents the solution for realization of these new requirements. The accompanying drawing illustrates some of the embodiments of the anti-skid element constructed according to this invention.

Figures 1A, 1B:
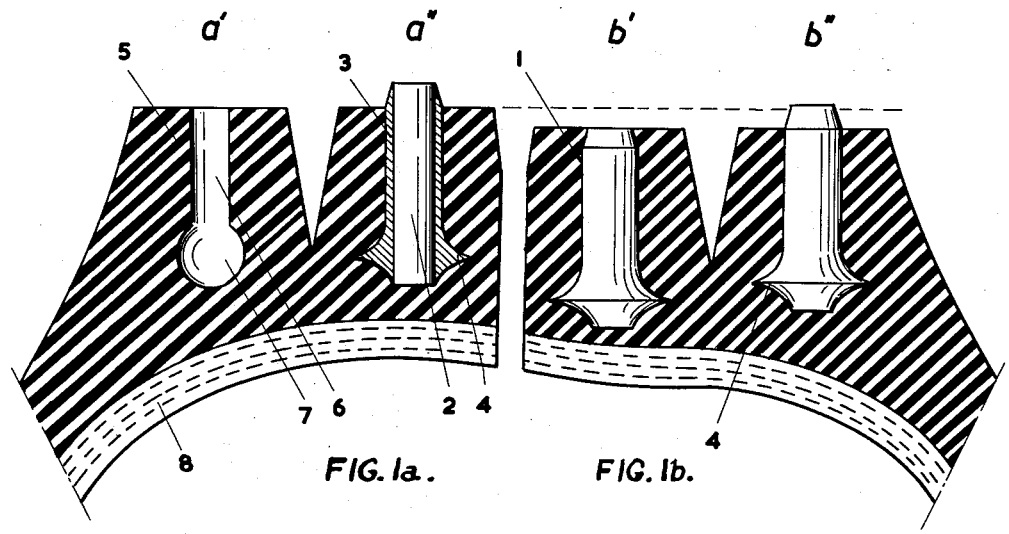
FIG. 1a is a schematic and partly cross-sectioned view of a preferred anti-skid element inserted into a tire tread according to the invention, the tire being free of a load.
FIG. 1b is a similar view of the tire under a load.

FIGURE 1a shows one very advantageous anti-skid element according to the invention which fulfills all the aforestated requirements. The anti-skid element 1 consists of a hard-metal, cylindrical plug 2 surrounded by a softer sleeve 3, the lower end of which has a flange 4 which tapers outwardly to form a sharp edge. A cylindrical bore 6 is provided at the point $a'$ in tread 5, the bottom end of which having an end portion 7 of larger diameter for the flange 4. The bore 6, 7 can be made in a new or a used retreated tire simultaneously with vulcanizing the tread or later by piercing the completed tire. The larger-diameter end portion 7 is made on the same level at which the flange 4 is intended to be placed. The anti-skid element according to the invention is dimensioned and fit into the tread so that its top end is level with the tread or, preferably to some extent, e.g. 2–3 mm., outside the surface and so that a rubber layer remains between its bottom end and the tire carcass 8, as seen from FIGURE 1. The smooth anti-skid element 1 is pressed into the bore with the aid of a convenient tool, e.g. a mandrel. The point $a''$ illustrates the anti-skid element fitted into the bore 6. The shape of the end portion 7 need not be the same as that of the flange but, on the contrary, it is quite sufficient if the bottom of the bore 6 is provided even with a relatively small slit, which stops the flange and from which the flange, after a while, will be forming its own proper bed by lifting laterally into the rubber tread. When the member 1 is pressed into the bore 6, the rubber of the tread gives away and forms a tight fit with the straight part of the element and also with the flange without leaving any space, as shown at point $a''$. Moreover, an element having even a relatively wide flange can be easily and quickly pressed into its bore whose top diameter is relatively small (for example, the relation between the diameter of the flange and the top diameter of the bore may be up to 30:1) in case there is substantial expansion into which the rubber can sink at the starting moment of insertion. Both of these above stated facts appeared quite unexpectedly during the experiments, and they assist greatly in the fastening of the anti-skid element.

FIG. 1b illustrates a tire under load and point $b'$ the situation when driving on a hard pavement such as asphalt. The point $b''$ illustrates driving on a semi-hard road surface such as an icy road. When driving on an icy road, the element always stays in a protruded position with its top end biting most effectively into the ice. On the other hand, when driving along a snow-free asphalt paved road, the element is pressed into the tire as shown in the figure at point $b'$. When the element during driving alternately contacts, and moves from the road surface, it is performing millions of back and forth movements, but with minimal friction due to the plastic sleeve around the element, its elasticity and softness protect the rubber from wear (contrary to what the cast would be by using steel or other metal for the sleeve, wherein, for instance, the friction between the rubber and steel would be quite considerable).

As both the top and the bottom end of the element is formed by the hard-metal plug 2, i.e., it extends through a plastic sleeve 3, there is no possibility for the element nor the plastic sleeve to break off at any of its parts, even when subjected to an exceptionally hard exterior shock.

It is very advantageous to arrange the flange part at the bottom end of the element, as in this way the angular changes are kept at a minimum and, at the same time, the inclination of the element is being prevented. This inclination is also prevented by the relatively broad and narrow-edged flange 4.

The sleeve 3 is formed and secured simultaneously around the plug 2 by injection molding or casting. In order to obtain a reliable and firm bonding of the sleeve to the plug 2, the latter is scored, its surface roughened or cross-grooved (see FIG. 3). In forming the supporting part by casting it is very easy to give it a suitable form for fulfilling the requirements of the anti-skid element. Useful materials for the sleeve include soft metal, such as brass or aluminium, or a plastic material which, after casting and during cooling, shrinks whereby it will form a tight fit with the plug 2.

Figure 2:
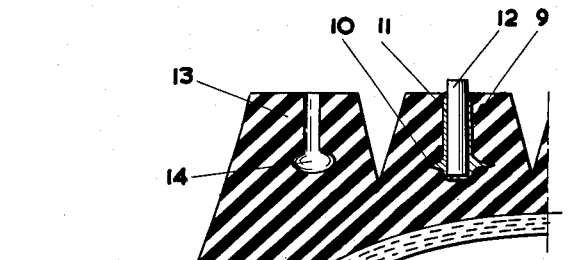
FIGURE 2 is a schematic and cross-sectioned view of another anti-skid element arranged in the tread of a tire.
Figure 3:
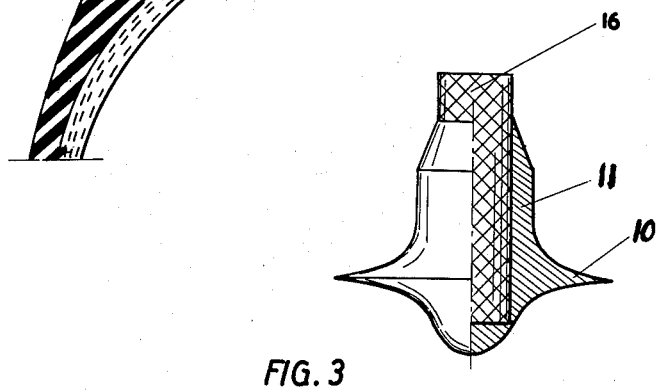
FIGURE 3 shows the embodiment of the element of FIG. 2 in part-section on a different scale.

In the embodiment of FIGS. 2 and 3, sleeve 11 does not extend right up to the top edge of the hard-metal plug 12, as in the embodiment shown by FIGURES 1a and 1b. In fact, it tapers inwardly toward the top and has its own special purpose, viz., when fastening the element to the tread during vulcanizing, the tapered top end is introduced into the cavity in the female mould, so that the elastic plastic material provides the necessary securing rigidity without any extra fastening means when the vulcanizing mould is being opened.

The anti-skid element 9 according to FIGURE 2 differs from the one shown in FIGURES 1a and 1b therein that its sleeve 11 has a wider flange 10 and does not reach to the top end of the hard-metal plug 12, and further, that the sleeve 11 covers the bottom end of the plug 12. Also, the form of the end portion 14 of the bore made into the tread 13 is elliptical to suit the form of the flange 10 in the anti-skid element. The hard-metal plug 12 is cross-grooved at 16, as shown in FIG. 3.

I claim:
1. An anti-skid element for the vulcanized rubber tread of a tire, comprising a straight plug of hard metal having a wear resistance comparable to that of the vulcanized rubber of the tread and an elongated sleeve of a plastic material softer than the hard metal surrounding the plug and injection-molded around said plug, the plastic material being adapted to shrink on cooling after injection-molding, the sleeve having a laterally extending flange spaced from an end of the sleeve and tapering gradually outwardly towards a sharp circumferential edge, and the plug having a roughened surface defined by criss-crossing grooves and extending within the sleeve at least to the level of the flange.

2. The anti-skid element of claim 1, wherein the plug extends in the sleeve below the flange.

References Cited by the Examiner
UNITED STATES PATENTS

| 2,627,888 | 2/53 | Bull | 152—210 |
| 2,982,325 | 5/61 | Pellaton | 152—210 |
| 3,125,147 | 3/64 | Hakka | 152—210 |

FOREIGN PATENTS

| 13,905 | 1915 | Great Britain. |

ARTHUR L. LA POINT, *Primary Examiner.*

R. A. DOUGLAS, *Examiner.*